Patented Jan. 9, 1951

2,537,936

UNITED STATES PATENT OFFICE 2,537,936

PREPARATION OF MELAMINE

Johnstone Sinnott Mackay, Old Greenwich, and Joseph H. Paden, Stamford, Conn., assignors to American Cyanamid Company, New York, N. Y., a corporation of Maine No Drawing. Application March 18, 1947, Serial No. 735,538

5 Claims. (Cl. 260—249.7)

The present invention relates to the preparation of melamine from thiotriazines.

An object of the invention is to produce melamine from such thiotriazines as thioammeline, dithioammelide and trithiocyanuric acid.

Another object of the invention is to produce melamine from such thiotriazines by a process which is economical and involves only simple apparatus and procedures.

Still another object of the invention is to produce melamine by simply heating such thiotriazines at moderately elevated temperatures in a closed reaction vessel and in the presence of ammonia.

Other objects will be apparent from the discussion that follows hereinafter.

It has now been found that melamine may be produced by heating one or more of the aforementioned thiotriazines at a moderately elevated temperature in the presence of ammonia and in a closed reaction vessel.

While the treatment of thiotriazines in accordance with the process of the invention to produce melamine may be carried out over a wide range of temperatures; it is preferred to employ a temperature of at least 300° C. At temperatures appreciably below 300° C. reaction occurs at a rate which is somewhat too low for practical use. While melamine is formed at temperatures substantially in excess of 600° C., difficulty is experienced in working at such excessive temperatures due to decomposition of the desired melamine so that generally it is preferred to employ a reaction temperature below 600° C. Still more preferably, temperatures within the range of about 350–500° C. may be employed for best results.

The formation of melamine from thiotriazines in accordance with the process of the present invention appears to take place through a series of obscure intermediate reactions involving considerably more than a simple replacement of the —SH group of such thiotriazines by an —NH$_2$ group with the formation of hydrogen sulfide. Whereas the thiotriazines are known to decompose on heating at temperatures such as those aforementioned with the formation of ammonia, the partial pressure of the ammonia so produced does not appear sufficient to convert any appreciable amount of the remaining undecomposed thiotriazine to melamine, except in the case of thioammeline. It may be that the partial pressure of the ammonia resulting from the decomposition of thioammeline is greater than that which results from heating trithiocyanuric acid and dithioammelide and/or that smaller partial pressures of ammonia than those required with the latter thiotriazines are sufficient to convert appreciable quantities of the thioammeline to melamine. In any event, the use of added ammonia is required to convert the trithiocyanuric acid and the dithioammelide to melamine and since its use results in considerably increased yields when converting thioammeline to melamine, it is preferred to employ it in that case also. On the other hand, the amount of such added ammonia which is required to effect a considerable increase in the yield of melamine is not very great, the use of such an amount of added ammonia as will provide an additional 200 pounds per square inch being sufficient. However, the use of still greater quantities of added ammonia still further increases the yield of melamine obtained and excessive quantities of such ammonia are in no way deleterious but rather serve to prevent the melamine produced by the process from decomposing at the elevated temperatures required by the process.

While, as aforementioned, little is known about the nature of the reactions involved in the conversion of the thiotriazines to melamine, it is known that guanidine thiocyanate is also formed in the course of the reaction and it is believed that much of the melamine may be formed as the result of decomposition of this intermediate. However, the advancement of such an explanation of the mechanism of the reactions involved in the process is not to be regarded as having any bearing on the construction or interpretation of the scope of the invention claimed herein.

The following examples are provided in order to afford a more detailed description of the process of the invention:

Example 1

45 grams of thioammeline are placed in a 300 cc. autoclave and 25 grams of ammonia are added. The autoclave is quickly sealed and heated to about 350° C. for two hours. Thereafter the autoclave is cooled under running water, vented, and the solid product is discharged. The reaction mixture is leached with cold water to first remove any guanidine thiocyanate and the melamine is then separated from the residue by placing the same in hot water, and, after a period of stirring, filtering to obtain the melamine in the filtrate. On concentration and cooling the melamine solution the resultant precipitate of the melamine provides 18.8 grams of the material.

*Example 2*

51 grams of dithioammelide are placed in a 300 cc. autoclave and 25 grams of ammonia are added. The autoclave is quickly sealed and heated to about 350° C. for two hours. Thereafter the autoclave is cooled under running water, vented and the solid product is discharged. Any guanidine thiocyanate present is separated from the reaction mixture by leaching with cold water and the melamine is separated from the residue by placing the same in hot water and after a period of stirring, filtering to obtain the melamine in the filtrate. On concentration and cooling the latter solution a precipitate of 10.6 grams of melamine is provided.

*Example 3*

57 grams of trithiocyanuric acid are placed in a 300 cc. autoclave and 25 grams of ammonia are added. The autoclave is quickly sealed and heated to about 350° C. for two hours. Thereafter the autoclave is cooled under running water, vented and the solid product is discharged. The guanidine thiocyanate present in the reaction mixture is separated by leaching with cold water, the residue is then placed in hot water and after a period of stirring, the mixture is filtered to obtain the melamine in the filtrate. Concentration and cooling the solution provides the melamine as a precipitate.

While the present invention has been described with particular reference to specific embodiments it is not to be held as limited thereby but is to be construed solely in the light of the appended claims.

What is claimed is:

1. The method of preparing melamine which consists of heating a thiotriazine and added ammonia in a closed reaction vessel at a temperature within the range of substantially 300–600° C. under the autogenously developed pressure, said pressure being at least 200 p. s. i.

2. The method according to claim 1 in which the temperature is within the range of substantially 350–500° C.

3. The method according to claim 2 in which the thiotriazine is thioammeline.

4. The method according to claim 2 in which the thiotriazine is thioammelide.

5. The method according to claim 2 in which the thiotriazine is trithiocyanuric acid.

JOHNSTONE SINNOTT MACKAY.
JOSEPH H. PADEN.

REFERENCES CITED

The following references are of record in the file of this patent:

Beilstein, vol. 26, pp. 257, 258, 4th ed.